United States Patent [19]

Nonomura et al.

[11] Patent Number: 5,398,055
[45] Date of Patent: Mar. 14, 1995

[54] SYSTEM FOR DETECTING STRAY LIGHT

[75] Inventors: Masamitsu Nonomura, Aichi; Atsushi Hirose; Kouji Horiba, both of Gifu, all of Japan

[73] Assignee: Sony Corporation, Tokyo, Japan

[21] Appl. No.: 92,462

[22] Filed: Jul. 16, 1993

[30] Foreign Application Priority Data

Jul. 23, 1992 [JP] Japan .................................. 4-197117

[51] Int. Cl.⁶ ............................................. H04N 7/18
[52] U.S. Cl. ........................................ 348/61; 348/86; 348/125; 348/189; 348/217
[58] Field of Search ................. 348/61, 189, 190, 191, 348/216, 217, 86, 125; H04N 7/18

[56] References Cited

U.S. PATENT DOCUMENTS 4,031,597  6/1977  Nubani .................................. 445/34
4,680,635  7/1987  Khurana ............................. 348/217

Primary Examiner—Howard W. Britton
Attorney, Agent, or Firm—Hill, Steadman & Simpson

[57] ABSTRACT

An apparatus for detecting undesired stray light generated in an electronic device, comprising a high sensitive photosensing device for picking up an image of the electronic device which emits the stray light and an image pickup filter for eliminating undesired signal components contained in the sensed output by the high sensitive photosensing device.

9 Claims, 6 Drawing Sheets

OUTPUT SIGNAL OF VIDEO PROCESSOR (25, FIG. 3)

ΔT = 16.56 ms
SAVE

PEAKDET 2ms

OUTPUT SIGNAL OF VIDEO PROCESSOR (34, FIG. 3)

ΔT = 15.56 ms
SAVE

PEAKDET 2ms

OUTPUT SIGNAL OF ACTIVE FILTER CIRCUIT
(PRIOR ART)

ΔT = 16.56ms
SAVE

PEAKDET 2ms

SYSTEM FOR DETECTING STRAY LIGHT

BACKGROUND OF THE INVENTION

1. Field of the Invention

The present invention relates to a system for detecting stray light and more particularly to a filter eliminating undesired signal components (disturbance light and various optical and electrical noises and the like) included in a video signal obtained from a high sensitive photosensing device.

2. Description of the Related Arts

As a method of detecting undesired light (stray emission) generated in an electron gun of a cathode ray tube (CRT), there has generally been practiced a method to electrically extract the wanted signal by cascading stages of electronic circuits such as active filter circuits using semiconductor devices. The output of such an active filter becomes a signal which has much noise components as shown in FIG. 7 and is bad in linearity.

The method of detecting weak stray emission generated from the electron gun of a CRT using an active filter circuit and the like as described above has the following drawbacks:

1) The circuit becomes complicated and has many positions where adjustments are required and, hence, the filter characteristics are liable to vary with changes in temperature and the like.

2) It is difficult for the circuit to eliminate high-frequency induced noises.

3) Necessary signal is considerably attenuated by the circuit and hence the signal level is lowered.

4) Linearity of the signal is worsened by the circuit.

SUMMARY OF THE INVENTION

The present invention was made in view of the above described problems. Accordingly, it is an object of the present invention to provide a stray light detection system which exhibits stabilized performance under the condition of changing temperature and allows its filter characteristic to be easily adjusted and, in addition, has excellent high-frequency noise eliminating capacity.

According to the present invention, the above mentioned problem is solved by a detecting apparatus for detecting undesired stray light generated in an electronic device comprising a high sensitive photosensing device for picking up an image of the electronic device emitting the stray light and an image pickup filter for eliminating undesired signal components contained in the output of the high sensitive photosensing device.

According to the present invention, it is preferred that the above described image pickup filter includes a video amplifier for amplifying a video signal obtained from the high sensitive photosensing device, a video display device for displaying a video signal generated from the video amplifier, a photosensing device for sensing the video displayed on the video display device, and a video processor for processing the video obtained from the photosensing device.

According to the present invention, it is, further, preferred that the functions of the video amplifier and the video display device are performed by a television monitor and the functions of the photosensing device and the video processor are performed by a general purpose television camera.

In the present invention, it is adapted, as shown in FIG. 1, such that the image of the stray light detection portion (the neck portion 2a of a CRT) of an electronic device to be measured is first picked up by the high sensitive photosensing device 4 and processed to a video signal, and then, the undesired signal components are eliminated from the video signal obtained by the high sensitive photosensing device 4 using the image pickup filter 7.

Accordingly, the present invention can output a video signal with a level whereby a comparator circuit in the subsequent stage can be operated in a stabilized manner.

DESCRIPTION OF THE PREFERRED EMBODIMENTS

An embodiment of the present invention will be described below with reference to the accompanying drawings.

Figure 1:
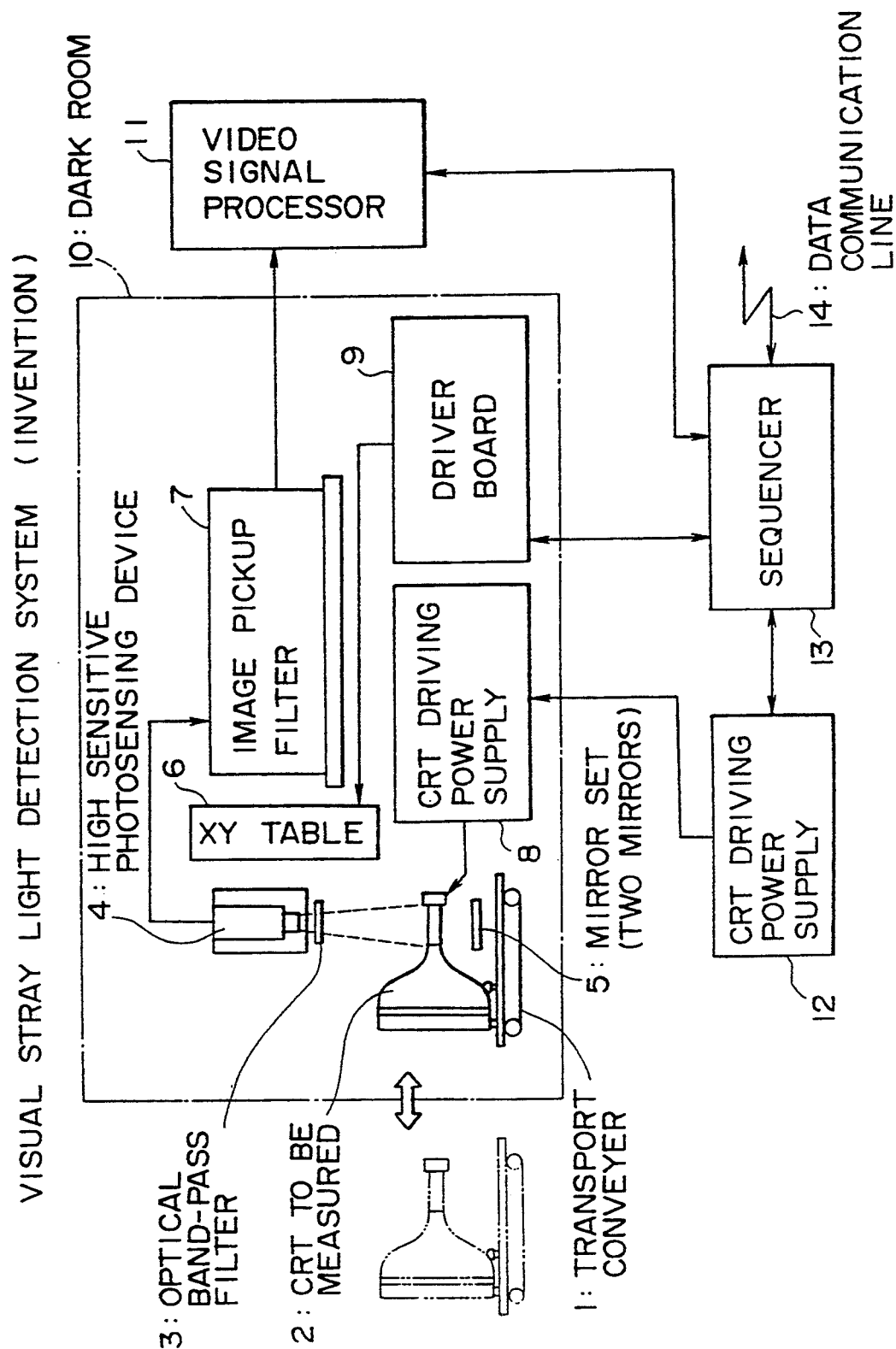
FIG. 1 is a block diagram showing a visual stray light detection system according to the present invention.

FIG. 1 is a block diagram showing a visual stray light detection system according to the present invention.

As shown in FIG. 1, the visual stray light detection system of the present invention is chiefly formed of a dark room 10 allowing therein a CRT 2 to be measured by means of a transport conveyer 1 and cutting off disturbance light so that weak light may be detected, an optical band-pass filter (filter for the band from the electron gun of a CRT) 3 allowing only stray light with wavelengths required to be detected to pass therethrough, a high sensitive photosensing device 4 formed of an image intensifier to be described later in detail and a CCD camera, and an image pickup filter 7 as an essential part of this invention for eliminating undesired signal components from a video signal obtained by the high sensitive photosensing device.

Figure 2:
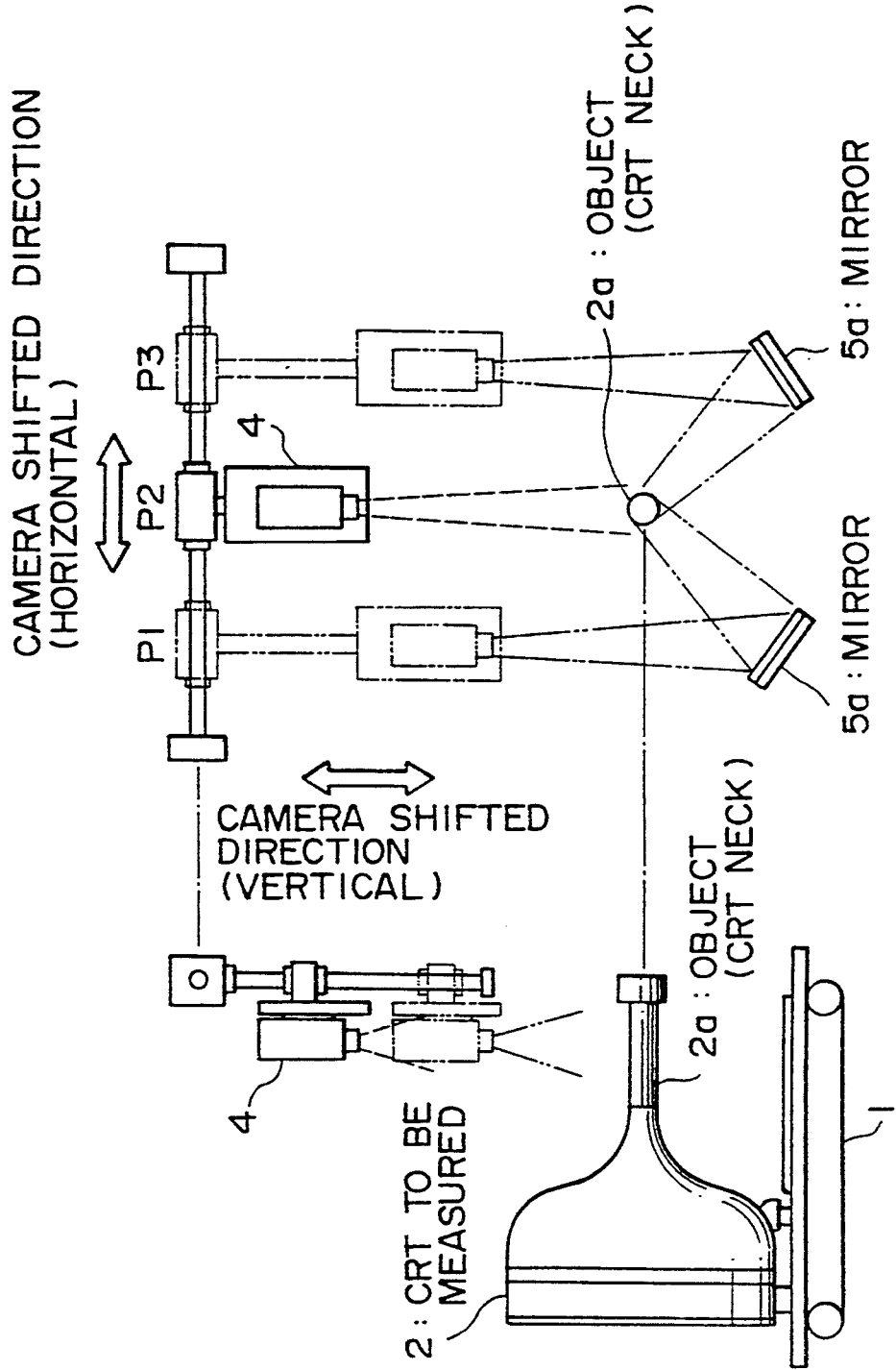
FIG. 2 is a diagram showing a mechanism for bringing the whole surface area of the object into the field of view.

Referring to FIG. 1, a mirror set 5 disposed in the vicinity of the CRT 2 to be measured is formed of two plane mirrors 5a and 5b arranged to form an angle therebetween as shown in FIG. 2 so as to allow one high-sensitivity photosensing device 4 to pick up image of the entire surface area of the electron gun of the CRT 2. An XY table 6 is a table for shifting the photosensing device 4 to the positions P1 to P3 shown in FIG. 2 and it is provided with a simple automatic position controlling function. The CRT 2 to be measured is driven by a CRT driving power supply 8 housed in a junction box.

Reference numeral 9 denotes a driver board for the shifting of the XY table 6 and selecting movement of the optical band-pass filter 3. Reference numeral 11 denotes a video signal processor for A/D conversion processing and arithmetic processing of a video signal obtained from the image pickup filter 7, 12 denotes a CRT driving power supply for driving the CRT 2 to be measured, 13 denotes a sequencer for performing control of the present system, calculation of data, judgment of acceptance/nonacceptance, transfer of data, etc., and 14 denotes a data communication line for transmitting data to the host computer.

Operation of the present stray light detection system will be described below. As a CRT 2 to be measured set on an inspection jig (pallet of vinyl chloride resin) is transported to the front of the present system, a door (not shown) of the dark room 10 is opened and the CRT 2 to be measured, together with the inspection jig, is sent into the dark room. At this time, the anode electrode of the CRT is automatically set into an electronic tube socket. Upon issuance of a completion-of-setting signal, the door is shut and the driving circuit system (high-voltage power supply, power supply for the gun, deflection circuits, etc.) of the CRT 2 is operated, and then, upon issuance of a completion-of-preparation signal, the present stray light detection system starts measurement.

The measurement is made in three positions (P1, P2, and P3) shown in FIG. 2. More specifically, two mirrors 5a and 5b are used in order to bring the whole surface area of the electron gun of the position to be measured (object 2a) of the CRT into the field of view of one high sensitive photosensing device 4 and preset positions with respect to focusing to the object, image quality, etc. are all traced. The image data thus obtained are subjected to A/D conversion processing and arithmetic processing and temporarily stored in a memory. The measurement up to this point is called the basic measurement. After the basic measurement has been finished, the same type of measurement is made with only the high-voltage circuit of the CRT drive circuit system turned off. This measurement is called the offset measurement.

The data as the aim of the measurement, i.e., the basic measurement data and the offset measurement data, are subjected to arithmetic processing. Thereafter, the whole data are transmitted over the data communication line 14 to the host computer and the measurement of the stray is thus completed. The CRT 2 with its measurement completed is taken out of the dark room 10 upon issuance of a completion-of-measurement signal and one cycle of operations of the stray light detection system is thus completed.

Below will be described the image pickup filter as the essential part of the stray light detection system of the present invention.

Figure 3:
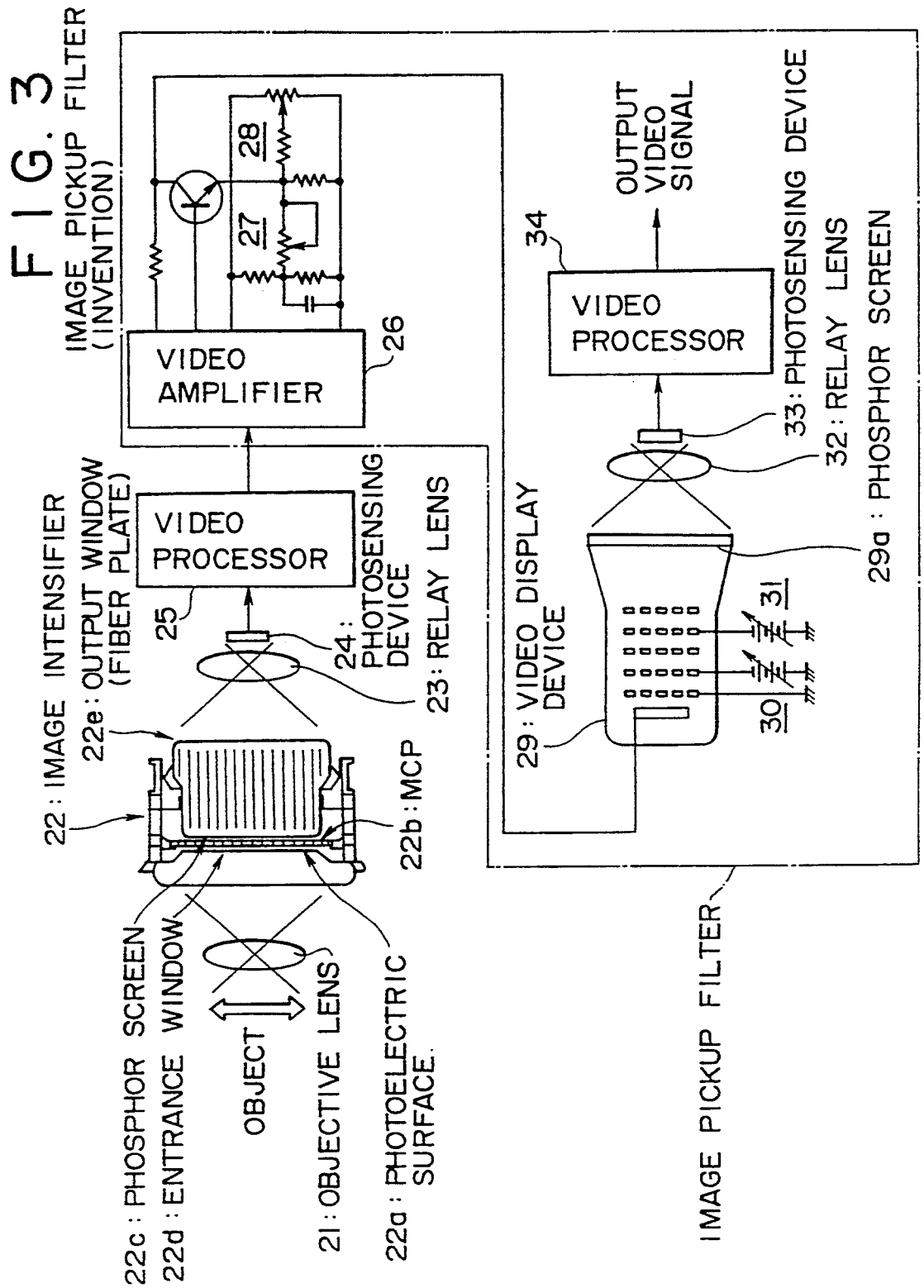
FIG. 3 is a block diagram showing an image pickup filter according to the present invention.

The present image pickup filter is arranged as shown in a block diagram of FIG. 3 and eliminates the undesired signal components from a video signal obtained by the high sensitive photosensing device 4 and supplies only the desired signal component to the image signal processor in the subsequent stage.

First, operation of the high sensitive photosensing device will be described. The image of the object (the electron gun of a CRT in the present system) is focused through an objective lens 21 on a photoelectric surface 22a of an image intensifier 22. Electrons in proportion to the brightness of the image are supplied from the photoelectric surface to a micro channel plate (hereinafter called MCP). Since each channel of the MCP 22b is provided with a potential gradient, the electrons are accelerated by the potential gradient and exit from the other side of the MCP after undergoing tens of collisions. At the collision, the wall surface emits secondary electrons, and as a result, total channels being 2.4 millions in number (each channel corresponding to one pixel) are intensified at the same time. The electrons multiplied in accordance with the brightness are caused to collide with a phosphor screen 22c through an entrance window 22d and thereby an optical image is obtained again. As a consequence of the foregoing, incident light is intensified by fifty to sixty thousand times and, thus, even though such things as an objective lens and an optical filter are interposed in the pass, an image whose illuminance is around 0.5 mLX on the photoelectric surface becomes visible.

The image on the phosphor screen 22c thus obtained is introduced through an output window 22e and by optical fibers, a relay lens 23, and the like to a photosensing device (for example a CCD photosensing device) 24 and converted into a video signal by a video processor 25. The video signal obtained here includes noise which is intrinsic to the characteristic (high sensitive characteristic) of the image intensifier 22 and it is quite difficult to readily extract only the stray light component from the video signal as it is.

Figure 7:
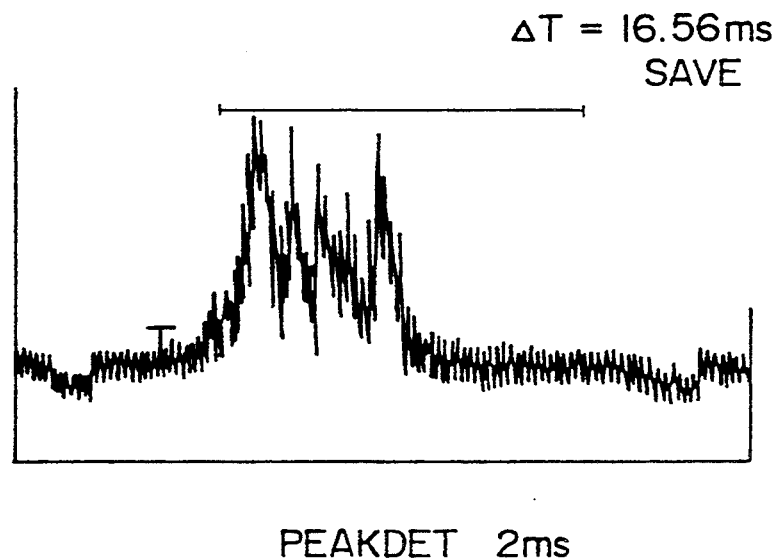
FIG. 7 is a diagram showing an output signal of a conventional active filter circuit.

Then, attempts to eliminate the noise by means of cascaded stages of various active filters using semiconductor devices as usual were made but the result obtained was not so good as shown in FIG. 7.

The image pickup filter according to the present invention is chiefly formed, as shown encircled by a chain line in FIG. 3, of a video amplifier 26 and subsequent circuits thereto, i.e., a video display device 29, a relay lens 32, a photosensing device 33, and a video processor 34.

The video amplifier 26 and the video display device 29 can be replaced with a TV monitor and the basic functions of the relay lens 32, photosensing device 33, and the video processor 34 can be performed by a general purpose TV camera.

The video amplifier 26 is provided with a drive adjusting mechanism 27 for adjusting the gain of the video signal and a background adjusting mechanism 28 for adjusting the DC level of the video signal. The video display device 29 is provided with a screen voltage adjusting mechanism 30 and a focusing voltage adjusting mechanism 31.

Operation of the image pickup filter of the above described arrangement will be described below with reference to FIG. 3.

Figure 4:
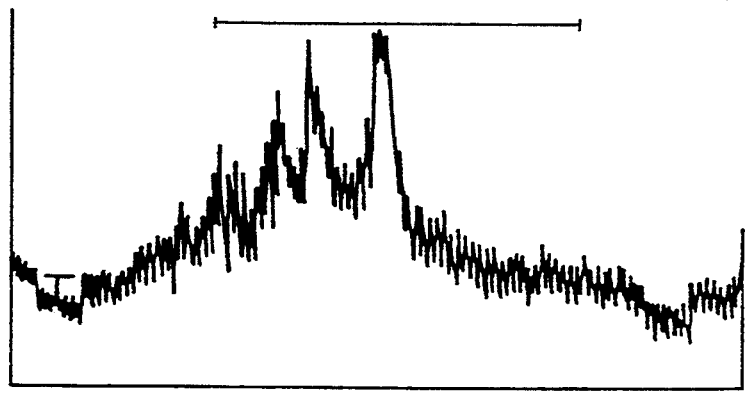
FIG. 4 is a diagram showing an output signal of a video processor (25 in FIG. 3)
Figure 5:
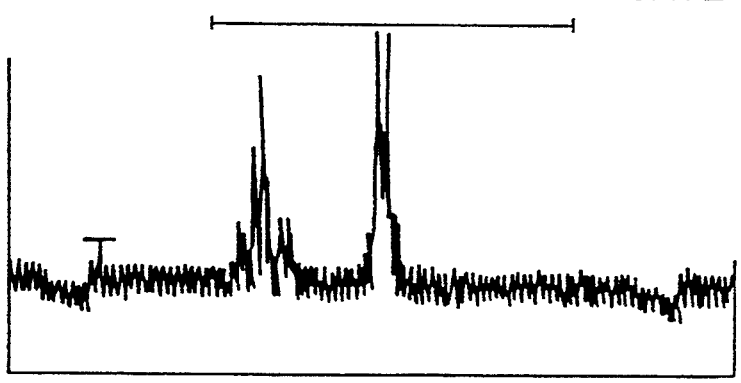
FIG. 5 is a diagram showing an output signal of a video processor (34 in FIG. 3)

Output signal (FIG. 4) obtained from the video processor 25 is amplified by the video amplifier 26 and applied to the video display device 29. An optical image is obtained on the phosphor screen 29a of the video display device 29 again and this image is introduced to the photosensing device 33 through the relay lens 32 and converted into a video signal again in the video processor 34. The output video signal of the video processor 34 is deprived of most of the undesired signal components as shown in FIG. 5 and becomes a signal with a level capable of operating a subsequent comparator circuit in a stabilized manner. Then, the output video signal is subjected to the A/D conversion processing and arithmetic processing in the video signal processor 11 in FIG. 1 and delivered to the sequencer 13 as numerical data.

Figure 6:
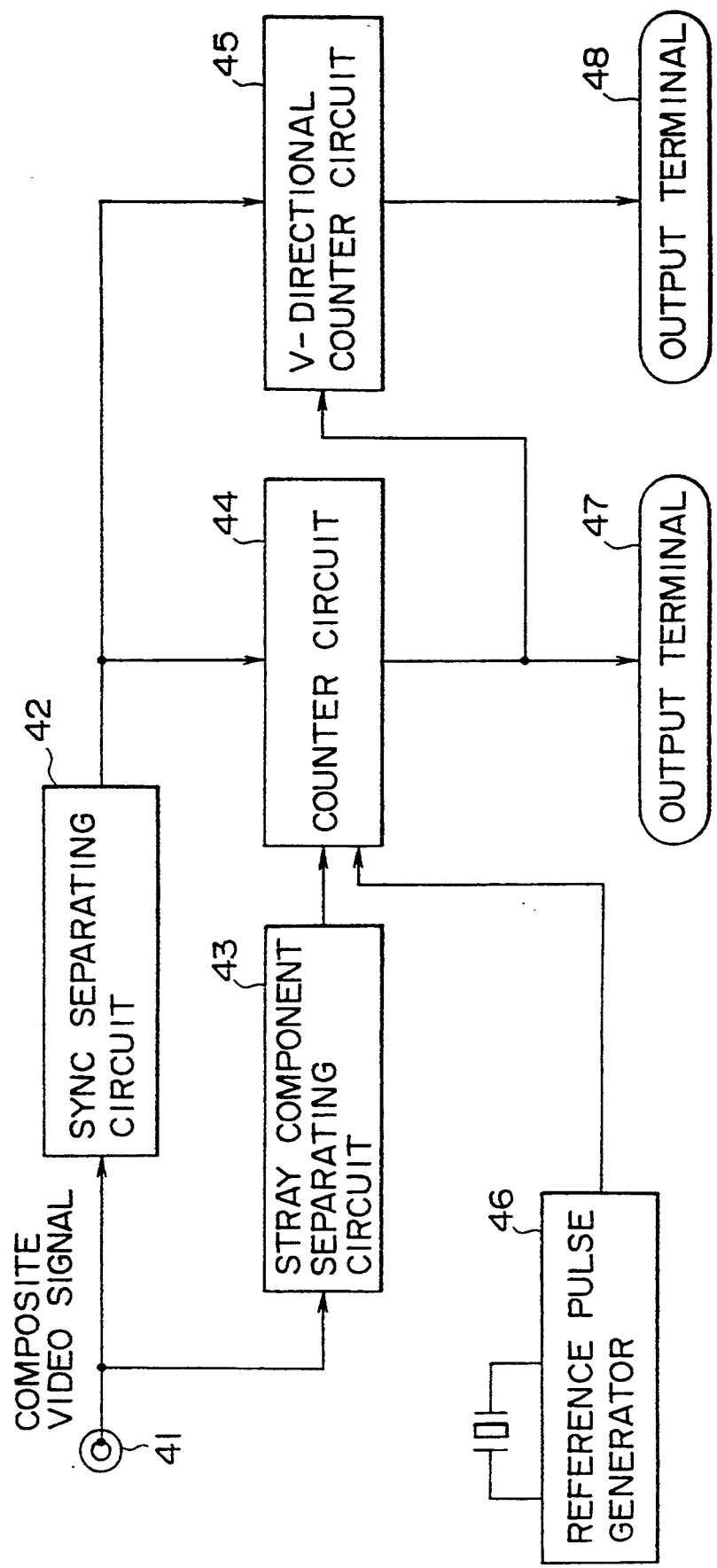
FIG. 6 is a block diagram showing an example of a video signal processor according to the present invention.

An example of the video signal processor is shown in FIG. 6.

Referring to FIG. 6, reference numeral 41 denotes an input terminal to which the output video signal of the image pickup filter is supplied. The video signal from the input terminal 41 is supplied to a sync separating circuit 42 and a counter clear signal is obtained at its output. The video signal from the input terminal 41 is also supplied to a stray component separating circuit 43 and the stray component is separated therein. The separated stray component is supplied to an H-directional counter circuit 44. The counter circuit 44 is also supplied with a reference pulse (for example at 4 µHz) from a reference pulse generator 46 so that the reference pulses are counted thereby during the period in which the stray component is existing. The counted output is taken out as a stray H-width output at an output terminal 47. Further, a portion of the H-width output is supplied to a V-directional counter circuit 45 so that the number of lines whose count is over "1" is counted and the count is output as a stray V-width output to an output terminal 48.

These H- and V-width outputs are supplied to the sequencer 13.

The filter characteristic of the present image pickup filter can be changed in various ways by means of the drive adjustment mechanism 27, background adjustment mechanism 28, screen voltage adjustment mechanism 30, and the like.

Further, by changing the material of the phosphor plate in the video display device 29, other characteristics such as that of time can be obtained.

According to the present invention, as described above, most of signal components other than the weak stray emission generated in the electron gun of a CRT and the like are eliminated and a signal having a level with which digital processing of the video signal is smoothly performed can be obtained. Further, the filter characteristic of the image pickup filter according to the present invention can be easily adjusted by the drive adjustment mechanism, background adjustment mechanism, and the like of the video amplifier. Besides, the system as a whole is stable against changes in temperature.

What is claimed is:

1. A detecting apparatus for detecting stray light emitted from an electronic device comprising:
   highly sensitive photosensing device for picking up a first image of said electronic device emitting the stray light and for generating a sensed output; and
   filter means having an image reproducing device for receiving said sensed output and producing a second image, and an image pickup device for picking up the second image reproduced by said image reproducing device, said filter means eliminating undesired components contained in said sensed output.

2. A detecting apparatus according to claim 1, wherein said electronic device is a cathode ray tube having an electron gun emitting said stray light component.

3. A detecting apparatus according to claim 1, further comprising carrying means for carrying said cathode ray tube to a position where said photosensing device can pick up the first image of said cathode ray tube.

4. A detecting apparatus according to claim 1, wherein said high sensitive photosensing device includes an image intensifier type camera generating a video signal as said sensed output.

5. A detecting apparatus according to claim 4, wherein said image reproducing device is a monitor and said image pickup device is a camera, and said filter means further includes a video amplifier supplied with said video signal and generating an amplified video signal, which is supplied to said monitor, and a video processor supplied with the output of said camera.

6. A detecting apparatus for detecting stray light emitted from an electronic device, comprising:
   a first photosensing means for picking up an image of stray light emitted from an electronic device and for generating a first electronic signal; and
   filter means for eliminating undesired components contained in said electronic signal, said filter means having an image reproducing means for receiving said first electronic signal and producing a second image, and an image pickup means for receiving said second image and producing a filtered second electronic signal.

7. A detecting apparatus according to claim 6, wherein said image reproducing means comprises a monitor and said image pickup means comprises a second camera, and said filter means further comprises a video processor electrically connected to said second camera to produce said second electronic signal.

8. A detecting apparatus according to claim 6, wherein said first photosensing means comprises an image intensifier type camera and said first electronic signal comprises a video signal.

9. A detecting apparatus according to claim 8, wherein said image reproducing means comprises a monitor and said image pickup means comprises a second camera, and said filter means further comprises a video amplifier supplied with said video signal and generating an amplified video signal, said amplified video signal received by said monitor, and a video processor electrically connected to said second camera to produce said second electronic signal.

* * * * *